United States Patent
Chen et al.

(10) Patent No.: US 12,452,002 B2
(45) Date of Patent: Oct. 21, 2025

(54) METHOD FOR REPORTING CHANNEL STATE INFORMATION (CSI), TERMINAL, AND COMPUTER-READABLE STORAGE MEDIUM

(71) Applicant: VIVO MOBILE COMMUNICATION CO., LTD., Dongguan (CN)

(72) Inventors: Xiaohang Chen, Dongguan (CN); Zhi Lu, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 505 days.

(21) Appl. No.: 17/869,766

(22) Filed: Jul. 20, 2022

(65) Prior Publication Data

US 2022/0360373 A1  Nov. 10, 2022

Related U.S. Application Data (63) Continuation of application No. PCT/CN2021/071722, filed on Jan. 14, 2021.

(30) Foreign Application Priority Data

Jan. 21, 2020 (CN) .......................... 202010072223.4

(51) Int. Cl.
*H04L 1/1829* (2023.01)
*H04L 1/1812* (2023.01)
*H04L 5/00* (2006.01)

(52) U.S. Cl.
CPC .......... *H04L 1/1854* (2013.01); *H04L 1/1812* (2013.01); *H04L 5/0053* (2013.01)

(58) Field of Classification Search
CPC ....... H04L 5/001; H04L 1/671; H04L 5/0053; H04L 5/0055; H04L 1/1854; H04W 72/23
See application file for complete search history.

(56) References Cited

U.S. PATENT DOCUMENTS 10,182,467 B2 *  1/2019  Park ...................... H04L 1/1822
11,595,973 B2 *  2/2023  Wang .................... H04L 5/0055
(Continued)

FOREIGN PATENT DOCUMENTS

| CN | 103973391 A | 8/2014 |
|---|---|---|
| CN | 108282210 A | 7/2018 |

(Continued)

OTHER PUBLICATIONS

Extended European Search Report issued in related European Application No. 21744556.8, mailed Jun. 19, 2023, 7 pages.
(Continued)

*Primary Examiner* — Mahran Y Abu Roumi
(74) *Attorney, Agent, or Firm* — IPX PLLC (57) ABSTRACT

A method for reporting Channel State Information (CSI), a terminal, and a computer-readable storage medium are provided. An exemplary method includes: receiving a Physical Downlink Shared CHannel (PDSCH) sent by a network device; and reporting CSI in a case that Hybrid Automatic Repeat reQuest-ACKnowledgment (HARQ-ACK) information corresponding to N PDSCHs includes at least one target HARQ-ACK. N is a positive integer, and the target HARQ-ACK is acknowledgment or negative acknowledgment.

20 Claims, 6 Drawing Sheets

(56) References Cited

U.S. PATENT DOCUMENTS

| | | | | |
|---|---|---|---|---|
| 2017/0041923 A1* | 2/2017 | Park | .................... | H04L 5/0053 |
| 2019/0104565 A1 | 4/2019 | Park | | |
| 2020/0228248 A1* | 7/2020 | Islam | .................... | H04L 5/0055 |
| 2020/0367265 A1* | 11/2020 | Wang | .................... | H04L 5/0055 |
| 2021/0044403 A1* | 2/2021 | Zhang | .................... | H04L 5/0053 |
| 2023/0021623 A1* | 1/2023 | Andersson | ............ | H04W 72/23 |

FOREIGN PATENT DOCUMENTS

| | | | |
|---|---|---|---|
| CN | 109802819 A | 5/2019 | |
| EP | 3242433 A1 | 11/2017 | |
| EP | 3695559 A1 | 8/2020 | |
| WO | WO-2014116061 A1 * | 7/2014 | ........... H04L 1/0026 |

OTHER PUBLICATIONS

International Search Report issued in corresponding International Application No. PCT/CN2021/071722, mailed Apr. 2, 2021, 4 pages.

Huawei, "Remaining Issues on PUCCH Structure in Short-duration", 3GPP TSG RAN WG1 Meeting #92bis R1-1803644, Apr. 2018.

* cited by examiner

METHOD FOR REPORTING CHANNEL STATE INFORMATION (CSI), TERMINAL, AND COMPUTER-READABLE STORAGE MEDIUM

CROSS-REFERENCE TO RELATED APPLICATIONS

This application is a continuation of International Application No. PCT/CN2021/071722, filed on Jan. 14, 2021, which claims priority to Chinese Patent Application No. 202010072223.4, filed on Jan. 21, 2020. The entire contents of each of the above-identified applications are expressly incorporated herein by reference.

TECHNICAL FIELD

The present disclosure relates to the field of communications technologies, and in particular, to a method for reporting Channel State Information (CSI), a terminal, and a computer-readable storage medium.

BACKGROUND

It is well-known that an aperiodic Channel State Information (CSI) reporting mechanism is introduced in a New Radio (NR) system. Conventional CSI reporting is triggered by a network device by using Downlink Control Information (DCI), that is, the network device performs uplink scheduling by using downlink signaling, to trigger aperiodic CSI reporting. When there is a relatively large quantity of downlink services or there is no uplink service, uplink scheduled downlink signaling is required for triggering the CSI reporting, resulting in additional signaling overheads and relatively large downlink signaling overheads.

SUMMARY

Embodiments of the present disclosure provide a method for reporting Channel State Information (CSI), a terminal, and a computer-readable storage medium.

According to a first aspect, an embodiment of the present disclosure provides a method for reporting CSI, applied to a terminal, the method including:
  receiving a Physical Downlink Shared CHannel (PDSCH) sent by a network device; and
  reporting CSI in a case that Hybrid Automatic Repeat reQuest-ACKnowledgment (HARQ-ACK) information corresponding to N PDSCHs includes at least one target HARQ-ACK, where
N is a positive integer, and the target HARQ-ACK is acknowledgment or negative acknowledgment.

According to a second aspect, an embodiment of the present disclosure provides a terminal, including:
  a receiving module, configured to receive a PDSCH sent by a network device; and
  a reporting module, configured to report CSI in a case that HARQ-ACK information corresponding to N PDSCHs includes at least one target HARQ-ACK, where:
  N is a positive integer, and the target HARQ-ACK is acknowledgment or negative acknowledgment.

According to a third aspect, an embodiment of the present disclosure provides a terminal, including a memory, a processor, and a program stored on the memory and executable on the processor, where the program, when executed by the processor, implements the steps of the method for reporting CSI.

According to a fourth aspect, an embodiment of the present disclosure provides a computer-readable storage medium, storing a computer program, where the computer program, when executed by a processor, implements the steps of the method for reporting CSI.

According to a fifth aspect, an embodiment of the present disclosure provides a terminal, configured to perform the method for reporting CSI.

According to a sixth aspect, an embodiment of the present disclosure further provides a computer program product, stored in a non-volatile storage medium, wherein the program product is configured to be executed by at least one processor to implement the steps of the method for reporting CSI.

In the embodiments of the present disclosure, a PDSCH sent by a network device is received; and CSI is reported in a case that HARQ-ACK information corresponding to N PDSCHs includes at least one target HARQ-ACK. In this way, CSI reporting is directly triggered based on the HARQ-ACK information, to reduce the downlink signaling overheads.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification and claims of the present disclosure, the term "include" and any variation thereof are intended to cover a non-exclusive inclusion, for example, a process, method, system, product, or device that includes a series of steps or units is not necessarily limited to those listed steps or units, but may include other steps or units that are not listed or are inherent to the process, method, product, or device. In addition, the use of "and/or" in the description and the claims means at least one of the connected objects, for example, three conditions such as A and/or B, indicating including A alone, B alone, and both A and B present.

In the embodiments of the present disclosure, the term such as "for example" is used to mean serving as an example, an illustration, or a description. Any embodiment or design scheme described as an "exemplary" or "for example" in the embodiments of the present disclosure should not be explained as being more preferred or having more advantages than another embodiment or design scheme. Exactly, use of the term "exemplary" or "for example" is intended to present a concept in a specific manner.

The following describes the embodiments of the present disclosure with reference to the accompanying drawings. A method for reporting Channel State Information (CSI), a terminal, a computer-readable storage medium provided in the embodiments of the present disclosure are applicable to a wireless communication system. The wireless communication system may be a $5^{th}$ Generation (5G) system, an Evolved Long Term Evolution (eLTE) system, or a subsequent evolved communication system.

Figure 1:
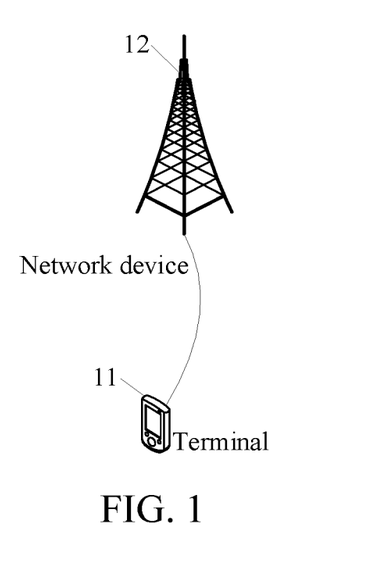
FIG. 1 is a structural diagram of a network system applicable to an embodiment of the present disclosure.

FIG. 1 is a structural diagram of a network system applicable to an embodiment of the present disclosure. As shown in FIG. 1, the network system includes a terminal 11 and a network device 12. The terminal 11 may be a user terminal or another terminal-side device such as a mobile phone, a tablet computer, a laptop computer, a Personal Digital Assistant (PDA), a Mobile Internet Device (MID), or a wearable device. It should be noted that a specific type of the terminal 11 is not limited in the embodiments of the present disclosure. The network device 12 may be a 5G base station, a base station of a later version, or a base station in other communication systems, or referred to as a NodeB, an evolved NodeB, or a Transmission Reception Point (TRP), or an Access Point (AP), or other vocabulary in the field. The network device is not limited to a specific technical vocabulary provided that a same effect is achieved. In addition, the network device 12 may be a Master Node (MN) or a Secondary Node (SN). It should be noted that, in the embodiments of the present disclosure, only the 5G base station is used as an example, but the specific type of the network device is not limited.

To facilitate understanding, the following explains content involved in the embodiments of the present disclosure.

Service Scenarios in NR

In a standardization process of an NR technology, three application scenarios of an enhanced Mobile BroadBand (eMBB), massive Machine Type Communications (mMTC), and Ultra-Reliable and Low-Latency Communications (URLLC) are mainly considered. Relatively large differences exist in performance requirements of the three applicable scenarios in aspects such as a data rate, a delay, reliability, connections, traffic density, and mobility. The eMBB scenario focuses on the data rate and the traffic density, the eMTC scenario focuses on the connections, and the URLLC focuses on the delay and the reliability. Because the scenarios of the types are closely related to a service attribute and a carrying requirement, the scenarios are referred to as service scenarios subsequently. Current standardization research focuses on the two service scenarios of eMBB and URLLC.

Aperiodic CSI Triggering and Reporting in NR

Similar to LTE, a downlink aperiodic CSI reporting mechanism is also introduced in NR, that is, a base station may trigger downlink CSI to be transmitted on a scheduled Physical Uplink Shared CHannel (PUSCH) through uplink scheduling as required. The base station may pre-configure an aperiodic trigger state list for a terminal (or referred to as User Equipment (UE)) by using Radio Resource Control (RRC) signaling. Each state corresponds to an associated reporting configuration information list, and each reporting configuration information indicates a reporting manner and which Channel State Information Reference Signal (CSI-RS) resource sets are used. In uplink scheduling DCI (only DCI Format 0_1 supports aperiodic CSI triggering at present), which pre-configured aperiodic trigger state is actually triggered is specifically indicated by using a "CSI request" field and corresponding CSI reporting information is carried on the scheduled PUSCH.

An offset K2 (a unit is slot) between a slot in which the scheduled PUSCH is located and a slot in which the uplink scheduling DCI is located is determined as follows.

In a case that a PUSCH carries a Transport Block (TB) and does not carry or carries downlink aperiodic CSI reporting information, an affected row in a pre-configured or designated table is determined by using a "time domain resource assignment" field as an index, and a slot offset in the affected row is obtained as an applied K2 value.

In a case that the PUSCH does not carry the TB and carries only the downlink aperiodic CSI reporting information, a valid reporting slot offset in a reporting slot offset list of each reporting configuration information in a reporting configuration information list corresponding to an actually triggered aperiodic trigger state is first determined by using a "time domain resource assignment" field as an index, and then a maximum value of the one or more reporting slot offsets (a quantity of reporting slot offsets is equal to a quantity of pieces of reporting configuration information in the list) is obtained as an applied K2 value.

Considering relatively large computational overheads of the CSI, a time position requirement of a first uplink symbol of a PUSCH carrying a CSI report is stipulated in the NR protocol, and the time position of the first uplink symbol is not earlier than that of any symbol of the following:

Zref is defined as a first uplink symbol after $T_{proc,CSI} = (Z)(2048+144)\cdot\kappa 2^{-\mu}\cdot T_c$ relative to an end moment of triggering DCI.

Z'ref(n) is defined as a first uplink symbol after $T_{proc,CSI} = (Z')(2048+144)\cdot\kappa 2^{-\mu}\cdot T_c$ relative to an end moment at which the last symbol occupied by the latest resource of used aperiodic measurement resources.

Values of Z and Z' may refer to corresponding values in Table 1 or Table 2 below under different cases.

TABLE 1

| | $Z_1$ [symbols] | |
| --- | --- | --- |
| μ | $Z_1$ | $Z'_1$ |
| 0 | 10 | 8 |
| 1 | 13 | 11 |

TABLE 1-continued

| | $Z_1$ [symbols] | |
|---|---|---|
| μ | $Z_1$ | $Z'_1$ |
| 2 | 25 | 21 |
| 3 | 43 | 36 |

TABLE 2

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

When the scheduled PUSCH does not meet the time position requirement, the UE may ignore corresponding aperiodic CSI reporting (when the scheduled PUSCH is not multiplexed with a HARQ-ACK or a TB) or not update corresponding CSI information.

A Hybrid Automatic Repeat reQuest-ACKnowledgment codebook (HARQ-ACK codebook):

For a process of supporting TB-level HARQ-ACK feedback, each TB correspondingly feeds back one HARQ-ACK bit. A plurality of Downlink (DL) HARQ procedures of each UE are supported, and a single DL HARQ procedure of each UE is also supported. The UE needs to indicate a capability of a minimum HARQ processing time thereof (the minimum HARQ processing time means a minimum time required from DL data receiving to corresponding HARQ-ACK transmission timing). For eMBB and URLLC, an asynchronous and non-adaptive DL HARQ is supported. From the perspective of the UE, HARQ-ACK feedback for a plurality of PDSCH may be transmitted in Uplink (UL) data or a control region in time, and one HARQ-ACK codebook is formed on the UL. Timing between PDSCH receiving and corresponding ACK/NACK is specified in DCI (referring to a PDSCH-to-HARQ timing indicator in DCI 1_0 and DCI 1_1).

Two types of HARQ-ACK codebooks are supported currently. Type-1 is a semi-static HARQ-ACK codebook and type-2 is a dynamic HARQ-ACK codebook. For the semi-static HARQ-ACK codebook, the UE determines the HARQ-ACK codebook according to all PDSCHs that may be fed back in a slot and determined according to parameters of a PDSCH monitoring occasion, PDSCH time domain resource allocation, PDSCH to HARQ-ACK feedback timing (dl-DataToUL-ACK or PDSCH-toHARQ-timing), and the like configured by using RRC. For the dynamic HARQ-ACK codebook, the UE determines the HARQ-ACK codebook according to actually scheduled PDSCHs. Because only the actually scheduled PDSCH is fed back, a size of the HARQ-ACK codebook is usually less than a size of the semi-static HARQ-ACK codebook. Which type of codebook is used by the UE is determined through RRC configuration.

Figure 2:
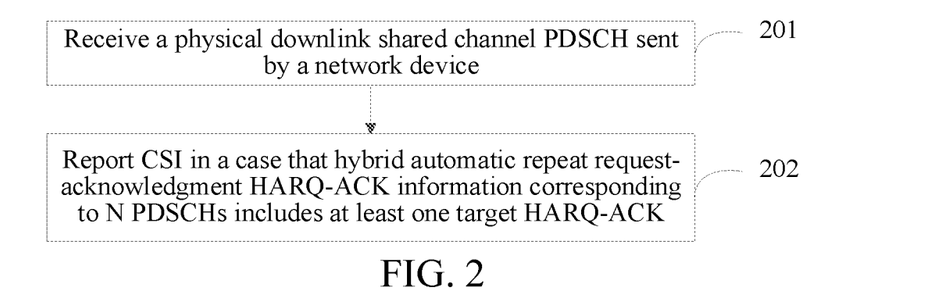
FIG. 2 is a flowchart of a method for reporting CSI according to an embodiment of the present disclosure.

FIG. 2 is a flowchart of a method for reporting CSI according to an embodiment of the present disclosure. The method is applied to a terminal. As shown in FIG. 2, the method includes the following steps.

Step 201. Receive a PDSCH sent by a network device.

Step 202. Report CSI in a case that HARQ-ACK information corresponding to N PDSCHs includes at least one target HARQ-ACK.

N is a positive integer, and the target HARQ-ACK is ACKnowledgment (ACK) or Negative ACKnowledgment (NACK).

In this embodiment of the present disclosure, the N PDSCHs may be PDSCHs received in one or more time units. a HARQ-ACK corresponding to each PDSCH is determined based on a decoding situation of each PDSCH. For example, if a PDSCH is correctly decoded, a HARQ-ACK corresponding to the PDSCH is ACK; and If a PDSCH is mistakenly decoded, a HARQ-ACK corresponding to the PDSCH is NACK. In other words, in this embodiment of the present disclosure, it is determined, according to decoding situations of the N PDSCHs, whether the CSI is reported.

In some embodiments, determining of one CSI reporting may be understood as that one CSI reporting is determined every time N PDSCHs are received; or may be understood as that when there is a PDSCH, one CSI reporting is determined based on HARQ-ACKs corresponding to N PDSCHs received within a preset time period. In other words, when HARQ-ACK information corresponding to N PDSCHs is fed back in a time unit A, one CSI reporting is determined. It should be understood that the time unit A may be understood as a time of feeding back the HARQ-ACK information corresponding to the N PDSCHs and is indicated by the network device by using higher layer signaling or scheduling signaling.

In an embodiment, the time unit A may be understood as a time unit for determining whether the CSI is reported, and G HARQ-ACKs corresponding to the N PDSCHs are fed back in the time unit A, where G is a positive integer greater than or equal to N. In some embodiments, when one PDSCH includes two TBs, a maximum quantity of corresponding HARQ-ACKs is two. When the terminal configures Code Block Group (CBG)-based HARQ-ACK feedback, one PUSCH include C CBGs, and a quantity of corresponding HARQ-ACKs is C.

In another embodiment, the time unit A may be understood as a time set for determining whether the CSI is reported, that is, the time unit A includes at least two time units such as from a time unit A1 to a time unit (A1+K), where K is a positive integer.

In this embodiment of the present disclosure, a PDSCH sent by a network device is received; and CSI is reported in a case that HARQ-ACK information corresponding to N PDSCHs includes at least one target HARQ-ACK. In this way, CSI reporting is directly triggered based on the HARQ-ACK information, to reduce the downlink signaling overheads.

Further, to improve pertinence for CSI reporting, the target HARQ-ACK may further be defined. For example, in an embodiment, the at least one target HARQ-ACK meets at least one of the following:

Condition 1. In a case that the target HARQ-ACK is negative acknowledgment, a quantity of target HARQ-ACKs is greater than or equal to a first preset value.

Condition 2. In a case that the target HARQ-ACK is acknowledgment, the quantity of target HARQ-ACKs is less than or equal to a second preset value.

Condition 3. In a case that the target HARQ-ACK is the negative acknowledgment, a proportion of the target HARQ-ACK is greater than or equal to a third preset value.

Condition 4. In a case that the target HARQ-ACK is the acknowledgment, the proportion of the target HARQ-ACK is less than or equal to a fourth preset value.

Condition 5. The at least one target HARQ-ACK corresponds to at least one HARQ-ACK codebook.

Condition 6. The at least one target HARQ-ACK corresponds to at least one Semi-Persistent Scheduling (SPS) PDSCH.

Condition 7. The at least one target HARQ-ACK corresponds to at least one SPS release signaling.

In this embodiment of the present disclosure, the network device may control the terminal to trigger CSI reporting by using ACK and/or NACK. For example, the CSI reporting may be specifically triggered based on ACK and/or NACK and by using DCI indication or RRC configuration.

In an embodiment, in a case that first indication information is indicated by using DCI or first configuration information is configured by using RRC, it is determined, based on NACK, whether the CSI is reported. The first indication information is used for indicating that the CSI is reported based on NACK, and the first configuration information is used for indicating that the CSI is reported based on NACK.

In another embodiment, in a case that second indication information is indicated by using the DCI or second configuration information is configured by using the RRC, it is determined, based on ACK, whether the CSI is reported. The second indication information is used for indicating that the CSI is reported based on ACK, and the second configuration information is used for indicating that the CSI is reported based on ACK.

In still another embodiment, in a case that third indication information is indicated by using the DCI or third configuration information is configured by using the RRC, it is determined, based on ACK and NACK, whether the CSI is reported. The third indication information is used for indicating that the CSI is reported based on ACK and NACK, and the third configuration information is used for indicating that the CSI is reported based on ACK and NACK.

In still another embodiment, in a case that fourth indication information is indicated by using the DCI or fourth configuration information is configured by using the RRC, it is determined, based on ACK or NACK, whether the CSI is reported. The fourth indication information is used for indicating that the CSI is reported based on ACK or NACK, and the fourth configuration information is used for indicating that the CSI is reported based on ACK or NACK.

Certainly, in other embodiments, indication information indicated by using the DCI and/or configuration information configured by using the RRC may further be used for indicating that the UE does not report the CSI based on the HARQ-ACK. In other words, the terminal does not report the CSI in a case that the network device indicates fifth indication information by using the DCI or configures fifth configuration information by using the RRC. The fifth indication information is used for indicating that the CSI is not reported, and the fifth configuration information is used for indicating that the CSI is not reported.

In some embodiments, a format of the DCI may be a fallback DCI format or a non-fallback DCI format. In some embodiments, the fallback DCI format may be a DCI format 1_0, and the non-fallback DCI format may be a DCI format 1_1 or a DCI format 1_2.

In this embodiment of the present disclosure, magnitudes of the first preset value, the second preset value, the third preset value, and the fourth preset value may be set according to an actual requirement, which are not specifically limited herein. The first preset value may be greater than the second preset value, and the third preset value may be greater than the fourth preset value. For example, in an embodiment, the first preset value, the second preset value, the third preset value, and the fourth preset value are specified in a protocol or configured by a network. For example, in an embodiment, the first preset value may be G.

In this embodiment of the present disclosure, it may be set, according to an actual situation, that the CSI is reported when one or more of the condition 1 to the condition 7 are met.

The condition 1 and the condition 2 may be understood as some or all of the target HARQ-ACKs. The condition 3 and the condition 4 may be understood as proportions corresponding to some or all of the target HARQ-ACKs.

For the condition 5, the HARQ-ACK information may correspond to one or more HARQ-ACK codebooks. In other words, a plurality of HARQ-ACKs included in the HARQ-ACK information belong to the one or more HARQ-ACK codebooks. The at least one target HARQ-ACK corresponding to at least one HARQ-ACK codebook may be understood as that when the HARQ-ACK information corresponds to at least two HARQ-ACK codebooks, at least one HARQ-ACK codebook includes at least one target HARQ-ACK.

In an embodiment, further, the condition of reporting the CSI may further include that in a case that the HARQ-ACK information corresponds to P HARQ-ACK codebooks, Q1 HARQ-ACK codebooks include at least one target HARQ-ACK, and priorities of the Q1 HARQ-ACK codebooks are higher than priorities of the remaining P-Q1 HARQ-ACK codebooks, where Q1 is a positive integer less than P and P is an integer greater than 1.

In another embodiment, the condition of reporting the CSI may further include that in a case that there are P HARQ-ACK codebooks, Q2 HARQ-ACK codebooks include at least one target HARQ-ACK. Q2 is a positive integer less than P, and Q2 is configured by a network.

Further, in an embodiment, it may further be defined that the CSI is reported when a HARQ-ACK codebook with a high priority includes a target HARQ-ACK. For example, in a case that the at least one HARQ-ACK codebook includes P HARQ-ACK codebooks, a priority of a first HARQ-ACK codebook is higher than a priority of a second HARQ-ACK codebook in the P HARQ-ACK codebooks. The second HARQ-ACK codebook is a HARQ-ACK codebook other than the first HARQ-ACK codebook in the P HARQ-ACK codebooks. P is an integer greater than 1.

For the condition 6, the N PDSCHs includes one or more SPS PDSCHs. For example, in a case that a HARQ-ACK corresponding to at least semi-persistent scheduling SPS PDSCH is the target HARQ-ACK, the CSI is reported. In other words, when HARQ-ACKs corresponding to some or all of the SPS PDSCHs are the target HARQ-ACKs, for example, the target HARQ-ACKs are NACK, at least one SPS PDSCH feeds back NACK, and the CSI is reported.

Further, in an embodiment, it may be defined that the CSI is reported when a HARQ-ACK corresponding to an SPS PDSCH with a high priority is the target HARQ-ACK. For example, the at least one SPS PDSCH includes a first SPS PDSCH. A priority of the first SPS PDSCH is higher than a priority of a second SPS PDSCH. The second SPS PDSCH is an SPS PDSCH other than the first SPS PDSCH in the SPS PDSCHs configured by the terminal. a HARQ-ACK corresponding to the first SPS PDSCH is the target HARQ-ACK.

In some embodiments, the at least one SPS PDSCH may correspond to at least one SPS resource configuration. When a quantity of at least one SPS PDSCHs is greater than 1, the SPS PDSCHs may include a first SPS PDSCH and a third SPS PDSCH. A priority of the first SPS PDSCH is higher than a priority of the third SPS PDSCH, and the third SPS PDSCH is an SPS PDSCH other than the first SPS PDSCH in the at least one SPS PDSCH. Then, the SPS resource configuration corresponding to the at least one SPS PDSCH includes a first SPS resource configuration. A priority of an SPS PDSCH configured by using the first SPS resource configuration is higher than a priority of an SPS PDSCH configured by using a second SPS resource configuration, and the second SPS resource configuration is an SPS resource configuration other than the first SPS resource configuration in the SPS resource configuration corresponding to the at least one SPS PDSCH.

It should be understood that in this embodiment, the SPS PDSCH with the high priority may be understood as that a HARQ-ACK codebook to which a HARQ-ACK corresponding to the SPS PDSCH belongs has a high priority, that is, the SPS PDSCH corresponds to a target HARQ-ACK with a high priority.

The condition 7 may be understood as that a HARQ-ACK corresponding to at least one SPS release signaling is the target HARQ-ACK. In other words, when HARQ-ACKs corresponding to some or all of SPS release signaling are the target HARQ-ACKs, for example, the target HARQ-ACKs are NACK, at least one SPS release signaling feeds back NACK, and the CSI is reported.

In this embodiment, the network device may send one or more SPS release signaling within a period of time. When receiving the SPS release signaling, the terminal determines a HARQ-ACK correspondingly fed back by the SPS release signaling. In a case that the HARQ-ACK correspondingly fed back by the SPS release signaling includes at least one target HARQ-ACK, the CSI reporting may be triggered. That is, in this embodiment, the method may include the following steps:

receiving, by the terminal, SPS release signaling sent by the network device; and reporting the CSI in a case that a HARQ-ACK corresponding to at least one SPS release signaling of T SPS release signaling is a target HARQ-ACK, where T is a positive integer. Further, it may further be defined that the CSI is reported in a case that HARQ-ACKs corresponding to Y SPS release signaling of the T SPS release signaling are target HARQ-ACKs. A value of Y may be configured by the network device or stipulated in a protocol. For example, Y may be a positive integer less than or equal to T.

Further, a HARQ-ACK corresponding to each SPS release signaling and the HARQ-ACK information corresponding to the N PDSCHs may be transmitted together.

It should be noted that, the HARQ-ACK information may be transmitted in M time units, and M is a positive integer. That is, HARQ-ACK corresponding to the HARQ-ACK information is transmitted in one or more time units. It should be understood that in an embodiment, a quantity of HARQ-ACK codebooks corresponding to the HARQ-ACK information is M, that is, one HARQ-ACK codebook is transmitted in each time unit. In another embodiment, a quantity of HARQ-ACK codebooks is U, and U≥M. At least one HARQ-ACK codebook is transmitted in each time unit of the M time units. In other words, in this embodiment of the present disclosure, the HARQ-ACK information is transmitted in a time unit m. In some embodiments, the HARQ-ACK information is transmitted from a time unit m to a time unit n, and n>m.

In some embodiments, the time unit may be understood as a slot, a sub-slot, a symbol, a subframe, or the like, which is not specifically limited herein.

Further, in a case that M is greater than 1, the at least one target HARQ-ACK meets at least one of the following:

in a case that the target HARQ-ACK is the negative acknowledgment, a quantity of target HARQ-ACKs is greater than or equal to a fifth preset value in L time units;

in a case that the target HARQ-ACK is the acknowledgment, the quantity of target HARQ-ACKs is less than or equal to a sixth preset value in the L time units;

in a case that the target HARQ-ACK is the negative acknowledgment, a proportion of the target HARQ-ACK is greater than or equal to a seventh preset value in the L time units; or in a case that the target HARQ-ACK is the acknowledgment, the proportion of the target HARQ-ACK is less than or equal to an eighth preset value in the L time units, where L is a positive integer less than or equal to M.

In this embodiment of the present disclosure, magnitudes of the fifth preset value, the sixth preset value, the seventh preset value, and the eighth preset value may be set according to an actual requirement, which are not specifically limited herein. The fifth preset value may be greater than the sixth preset value, and the seventh preset value may be greater than the eighth preset value. For example, in an embodiment, the fifth preset value, the sixth preset value, the seventh preset value, and the eighth preset value are specified in a protocol or configured by a network. For example, in an embodiment, the fifth preset value may be less than or equal to 1.

A value of L may be set according to an actual requirement. For example, in this embodiment of the present disclosure, the value of L may be configured by the network device or stipulated in a protocol.

For example, in an embodiment, in a case that L is less than M, the L time units are the last L time units in the M time units that are sorted in an order from first to last of times. For example, in a case that the HARQ-ACK information is transmitted in four time units (a time unit 1, a time unit 2, a time unit 3, and a time unit 4), and in a case that L is 2, it may be determined, according to the HARQ-ACK information fed back in the time unit 3 and the time unit 4, whether the CSI is reported.

For example, in an embodiment, each time unit of the L time units includes at least one target HARQ-ACK. For example, in a case that the HARQ-ACK information is transmitted in four time units (a time unit 1, a time unit 2, a time unit 3, and a time unit 4), and HARQ-ACKs fed back in each time unit of the time unit 1, the time unit 2, the time unit 3, and the time unit 4 include a target HARQ-ACK, the CSI reporting is triggered. Because it is defined that the HARQ-ACKs fed back in each time unit include the target HARQ-ACKs, it may be determined that a channel state of a user is relatively poor, so that the CSI reporting is trigger, thereby reducing a quantity of times of CSI reporting and improving the effectiveness of the CSI reporting.

For example, in an embodiment, the quantity of target HARQ-ACKs includes any one of the following:

a quantity of target HARQ-ACKs in one HARQ-ACK codebook, where the HARQ-ACK codebook is any HARQ-ACK codebook corresponding to the HARQ-ACK information;

quantities of target HARQ-ACKs in all HARQ-ACK codebooks corresponding to the HARQ-ACK information;

a quantity of target HARQ-ACKs of a first serving cell, where the first serving cell is any serving cell of all serving cells corresponding to the HARQ-ACK codebook; or a sum of quantities of target HARQ-ACKs of all the serving cells corresponding to the HARQ-ACK codebook.

The proportion of the target HARQ-ACK includes any one of the following:

a ratio of a quantity of target HARQ-ACKs in one HARQ-ACK codebook to a quantity of HARQ-ACKs included in the HARQ-ACK codebook, where the HARQ-ACK codebook is any HARQ-ACK codebook corresponding to the HARQ-ACK information;

a ratio of quantities of target HARQ-ACKs in all HARQ-ACK codebooks corresponding to the HARQ-ACK information to quantities of HARQ-ACKs included in all the HARQ ACK codebooks;

a ratio of a quantity of target HARQ-ACKs of a second serving cell to a quantity of HARQ-ACKs of the second serving cell, where the second serving cell is any serving cell of all serving cells corresponding to the HARQ-ACK codebook; or a ratio of a sum of quantities of target HARQ-ACKs of all the serving cells corresponding to the HARQ-ACK codebook to a sum of quantities of HARQ-ACKs of all the serving cells.

It should be understood that the CSI reporting may be transmitted on a Physical Uplink Control CHannel (PUCCH). In an embodiment, the PUSCH may be multiplexed with the HARQ-ACK to send a CSI report. In this embodiment of the present disclosure, the reported CSI should be understood as an aperiodic CSI report.

In some embodiments, a CSI report triggered based on NACK may be a type A (that is, a CSI report A), and a CSI report triggered based on ACK is a type B (that is, a CSI report B). A target object included in the CSI report A is the same as or different from a target object included in the CSI report B. The target object may be content or a quantity of bits.

For example, in an embodiment, the CSI report A may include an entire wideband Channel Quality Indicator (CQI) and/or a wideband Precoding Matrix Indicator (PMI), or the like. The CSI report B includes a subband CQI and/or a subband PMI, or the like. In another embodiment, the CSI report A includes a subband CQI and/or a subband PMI, or the like. The CSI report B includes a wideband CQI and/or a wideband PMI, or the like.

For ease of understanding the present disclosure, implementations of the present disclosure are described in detail below with reference to specific embodiments.

Scenario 1. In a case that a UE receives a plurality of PDSCHs and feeds back corresponding HARQ-ACK information at a time n, the UE determines, according to decoding situations of the PDSCHs, whether the CSI is reported.

For example, in a case that there is at least one NACK information, the UE reports the CSI. Further, the UE may report the CSI when at least one of the following conditions is met.

Condition 1. All the feedback HARQ-ACK information is NACK.

Condition 2. A quantity K of NACKs included in the feedback HARQ-ACK information is greater than or equal to X or a proportion R of NACK is greater than or equal to Y. X or Y is a predefined value or a value configured by a network.

Condition 3. In a case that the UE feeds back more than one HARQ-ACK codebook, at least one HARQ-ACK codebook includes at least one piece of NACK information. Further, that the at least one HARQ-ACK codebook includes the at least one piece of NACK information may be understood as that there is a HARQ-ACK codebook with a high priority and the HARQ-ACK codebook with the high priority includes the at least one piece of NACK information.

Condition 4. At least one piece of NACK information corresponding to an SPS PDSCH or SPS release is included. Further, that the at least one piece of NACK information corresponding to the SPS PDSCH is included may be understood as that at least one piece of NACK information of an SPS PDSCH with a high priority is included.

Scenario 2. In a case that the UE receives a plurality of PDSCHs and feeds back corresponding HARQ-ACK information within a time n to a time n+k, the UE determines, according to decoding situations of the PDSCHs, whether the CSI is reported. k is configured by the network device or stipulated in a protocol.

For example, in a case that the HARQ-ACK information fed back within the time n to the time n+k has at least one piece of NACK information, the UE feeds back the CSI report. Further, the UE may feed back the CSI report when at least one of the following conditions is met.

Condition 1. All the feedback HARQ-ACK information is NACK.

Condition 2. A quantity K of NACKs included in the feedback HARQ-ACK information is greater than or equal to X or a proportion R of NACK is greater than or equal to Y. X or Y is a predefined value or a value configured by a network.

Condition 3. The UE needs to feed back j pieces of NACK information within a time m to the time n+k. m≥n, and j is less than or equal to a quantity of PDSCHs.

Condition 4. There is more than one HARQ-ACK codebook between the time n and the time n+k, and at least one HARQ-ACK codebook includes at least one piece of NACK information. Further, that the at least one HARQ-ACK codebook includes the at least one piece of NACK information may be understood as that there is an HARQ-ACK codebook with a high priority and the HARQ-ACK codebook with the high priority includes the at least one piece of NACK information.

Condition 5. At least one piece of NACK information corresponding to an SPS PDSCH is included within the time n to the time n+k. Further, that the at least one piece of NACK information corresponding to the SPS PDSCH is included may be understood as that at least one piece of NACK information of an SPS PDSCH with a high priority is included.

The scenario 1 and the scenario 2 may further be expanded.

For example, in an embodiment, the NACK may be replaced with ACK.

In some embodiments, the network device instructs the UE to trigger the CSI reporting based on ACK and/or NACK.

For example, in an embodiment, in a case that first indication information is indicated by using DCI and/or first configuration information is configured by using RRC, the UE reports CSI when requiring to feed back NACK. In a case that second indication information is indicated by using the DCI and/or second configuration information is configured by using the RRC, the UE reports the CSI when requiring to feed back ACK. In a case that third indication information is indicated by using the DCI and/or third configuration information is configured by using the RRC, the UE reports the CSI when requiring to feed back ACK or NACK.

In some embodiments, a method for calculating a quantity or a proportion of NACKs may include any one of the following:

Manner 1. The proportion of NACKs is equal to a quantity of NACKs in one HARQ-ACK codebook divided by a quantity of HARQ-ACKs in the HARQ-ACK codebook.

Manner 2. The proportion of NACKs is equal to quantities of NACKs in all HARQ-ACK codebooks divided by quantities of HARQ-ACKs in all the HARQ-ACK codebooks.

Manner 3. The proportion of NACKs is equal to a quantity of NACKs of one serving cell in one HARQ-ACK codebook divided by a quantity of HARQ-ACKs of the serving cell in the HARQ-ACK codebook.

Manner 4. The proportion of NACKs is equal to quantities of target HARQ-ACKs of all serving cells corresponding to one HARQ-ACK codebook divided by quantities of HARQ-ACK of all the serving cells.

It should be understood that the HARQ-ACK codebook may be understood as a type 1 HARQ-ACK codebook or a type 2 HARQ-ACK codebook.

In some embodiments, the CSI reporting may meet at least one of the following:
- the CSI is reported on a PUCCH;
- the PUCCH is multiplexed with the HARQ-ACK to send a CSI report;
- the reported CSI is an aperiodic CSI report; and
- a CSI report triggered based on NACK may be a type A (that is, a CSI report A), and a CSI report triggered based on ACK is a type B (that is, a CSI report B). A target object included in the CSI report A is the same as or different from a target object included in the CSI report B. The target object may be content or a quantity of bits. It should be understood that in this embodiment of the present disclosure, the CSI reporting may be understood as feeding back or sending a CSI report.

Figure 3:
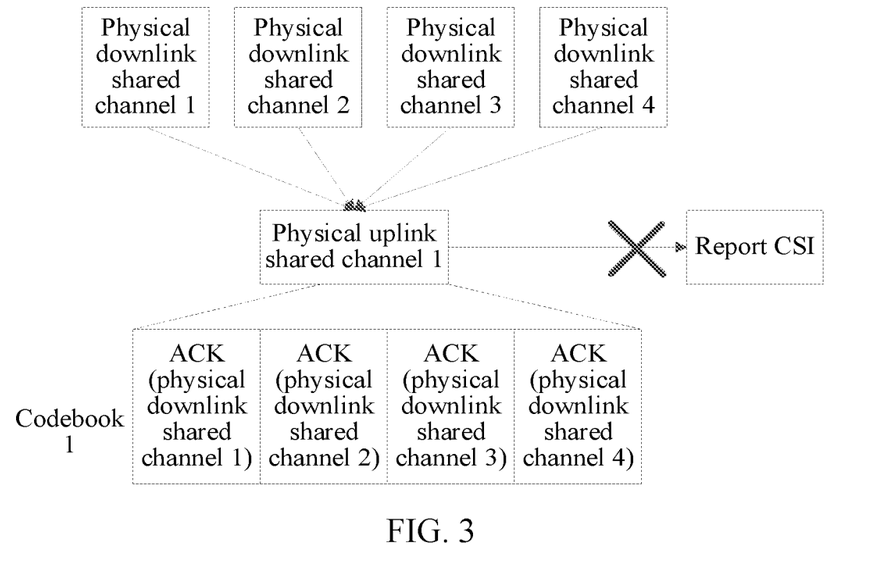
FIG. 3 is a first exemplary diagram of CSI reporting in a method for reporting CSI according to an embodiment of the present disclosure.

As shown in FIG. 3, in an embodiment, in a case that the UE receives PDSCHs 1 to 4 and feeds back a HARQ-ACK codebook 1 in a slot n, the HARQ-ACK codebook 1 includes HARQ-ACK information corresponding to the PDSCHs 1 to 4. In a case that all HARQ-ACKs of the PDSCHs 1 to 4 are ACK, the UE does not report CSI.

Figure 4:
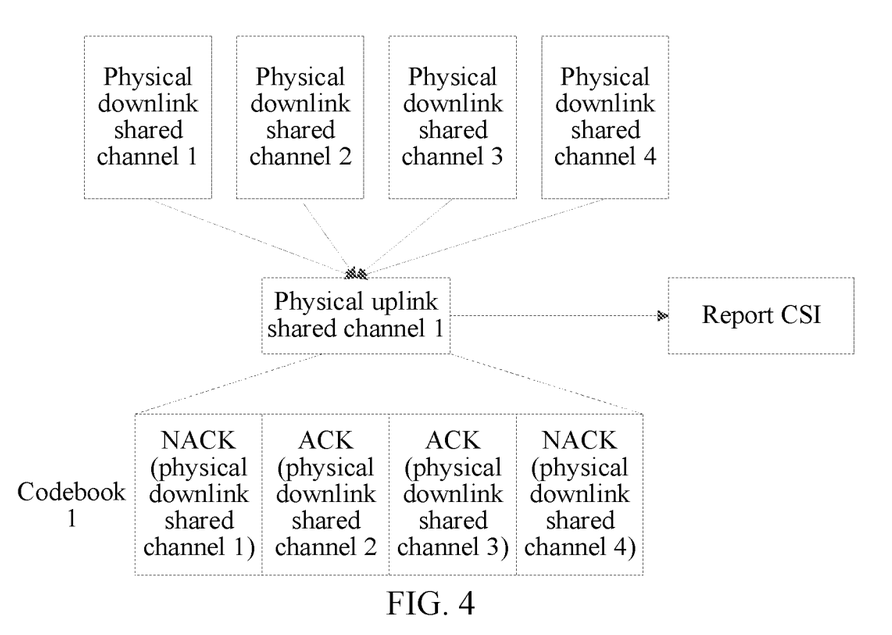
FIG. 4 is a second exemplary diagram of CSI reporting in a method for reporting CSI according to an embodiment of the present disclosure.

As shown in FIG. 4, in an embodiment, in a case that the UE receives PDSCHs 1 to 4 and feeds back a HARQ-ACK codebook 1 in a slot n, the HARQ-ACK codebook 1 includes HARQ-ACK information corresponding to the PDSCHs 1 to 4. In a case that HARQ-ACKs of the PDSCH 1 and the PDSCH 4 are NACK, that is, the HARQ-ACK codebook 1 includes at least one piece of NACK information, the UE reports the CSI.

Figure 5:
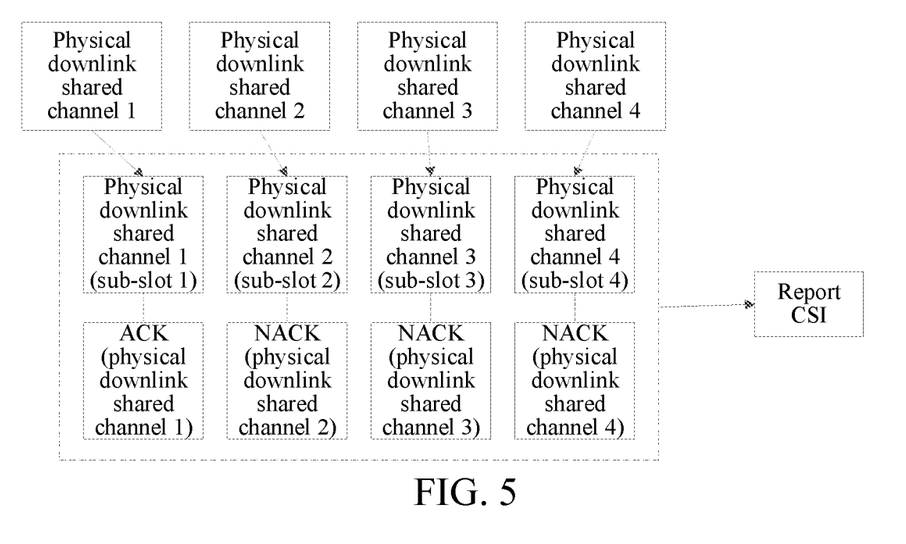
FIG. 5 is a third exemplary diagram of CSI reporting in a method for reporting CSI according to an embodiment of the present disclosure.

As shown in FIG. 5, in an embodiment, the UE receives PDSCHs 1 to 4 and feeds back HARQ-ACK information corresponding to the PDSCHs 1 to 4. a HARQ-ACK corresponding to each PDSCH is fed back in a sub-slot.

In a case that the UE continuously feeds back N=3 pieces of NACK information (N is a value configured by a network) in sub-slots 2 to 4, that is, the HARQ-ACK information corresponding to the PDSCHs 2 to 4 is NACK, the UE reports the CSI.

Figure 6:
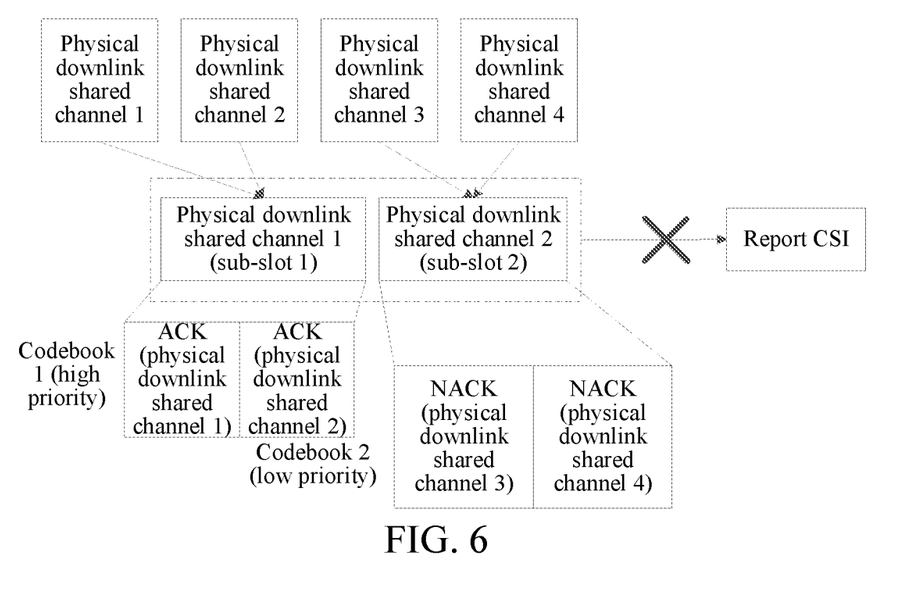
FIG. 6 is a fourth exemplary diagram of CSI reporting in a method for reporting CSI according to an embodiment of the present disclosure.

As shown in FIG. 6, in an embodiment, the UE receives PDSCHs 1 to 4 and feeds back HARQ-ACK information corresponding to the PDSCHs 1 to 4 in a slot n. a HARQ-ACK codebook 1 corresponding to the PDSCHs 1 and 2 has a high priority, and the HARQ-ACK codebook 1 is transmitted in a sub-slot 1. a HARQ-ACK codebook 2 corresponding to the PDSCHs 3 and 4 has a low priority, and the HARQ-ACK codebook 2 is transmitted in a sub-slot 2.

Although the HARQ-ACK codebook 2 with the low priority includes NACK information corresponding to the PDSCH 3 and the PDSCH 4, the HARQ-ACK codebook 1 with the high priority does not include NACK information. Therefore, the UE does not report the CSI.

Figure 7:
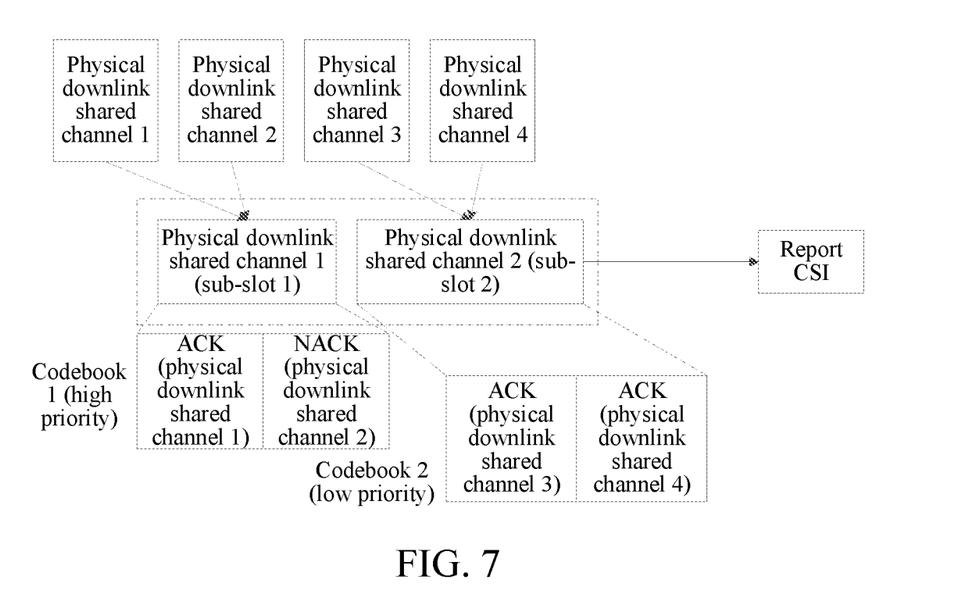
FIG. 7 is a fifth exemplary diagram of CSI reporting in a method for reporting CSI according to an embodiment of the present disclosure.

As shown in FIG. 7, in an embodiment, the UE receives PDSCHs 1 to 4 and feeds back HARQ-ACK information corresponding to the PDSCHs 1 to 4 in a slot n. a HARQ-ACK codebook 1 corresponding to the PDSCHs 1 and 2 has a high priority, and the HARQ-ACK codebook 1 is transmitted in a sub-slot 1. a HARQ-ACK codebook 2 corresponding to the PDSCHs 3 and 4 has a low priority, and the HARQ-ACK codebook 2 is transmitted in a sub-slot 2.

Because the HARQ-ACK codebook 1 with the high priority includes NACK information corresponding to the PDSCH 2, the UE reports the CSI.

Figure 8:
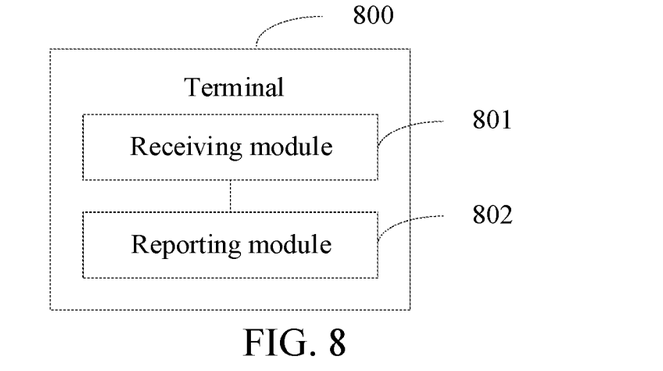
FIG. 8 is a structural diagram of a terminal according to an embodiment of the present disclosure.

FIG. 8 is a structural diagram of a terminal 800 according to an embodiment of the present disclosure. As shown in FIG. 8, the terminal 800 includes:
- a first receiving module 801, configured to receive a PDSCH sent by a network device; and
- a reporting module 802, configured to report CSI in a case that HARQ-ACK information corresponding to N PDSCHs includes at least one target HARQ-ACK, where
- N is a positive integer, and the target HARQ-ACK is acknowledgment or negative acknowledgment.

In some embodiments, the at least one target HARQ-ACK meets at least one of the following:
- in a case that the target HARQ-ACK is the negative acknowledgment, a quantity of target HARQ-ACKs is greater than or equal to a first preset value;
- in a case that the target HARQ-ACK is the acknowledgment, the quantity of target HARQ-ACKs is less than or equal to a second preset value;
- in a case that the target HARQ-ACK is the negative acknowledgment, a proportion of the target HARQ-ACK is greater than or equal to a third preset value;
- in a case that the target HARQ-ACK is the acknowledgment, the proportion of the target HARQ-ACK is less than or equal to a fourth preset value;
- the at least one target HARQ-ACK corresponds to at least one HARQ-ACK codebook;
- the at least one target HARQ-ACK corresponds to at least one semi-persistent scheduling SPS PDSCH; or
- the at least one target HARQ-ACK corresponds to at least one SPS release signaling.

For example, in a case that the at least one HARQ-ACK codebook includes P HARQ-ACK codebooks, a priority of a first HARQ-ACK codebook is higher than a priority of a second HARQ-ACK codebook in the P HARQ-ACK codebooks, and the second HARQ-ACK codebook is a HARQ-ACK codebook other than the first HARQ-ACK codebook in the P HARQ-ACK codebooks, where P is an integer greater than 1.

In some embodiments, the at least one SPS PDSCH includes a first SPS PDSCH, a priority of the first SPS PDSCH is higher than a priority of a second SPS PDSCH, and the second SPS PDSCH is an SPS PDSCH other than the first SPS PDSCH in all SPS PDSCHs configured by the terminal.

In some embodiments, the first preset value, the second preset value, the third preset value, and the fourth preset value are specified in a protocol or configured by a network.

In some embodiments, the HARQ-ACK information is transmitted in M time units, and M is a positive integer.

In some embodiments, in a case that M is greater than 1, the at least one target HARQ-ACK meets at least one of the following:
- in a case that the target HARQ-ACK is the negative acknowledgment, a quantity of target HARQ-ACKs is greater than or equal to a fifth preset value in L time units;
- in a case that the target HARQ-ACK is the acknowledgment, the quantity of target HARQ-ACKs is less than or equal to a sixth preset value in the L time units;
- in a case that the target HARQ-ACK is the negative acknowledgment, a proportion of the target HARQ-ACK is greater than or equal to a seventh preset value in the L time units; or
- in a case that the target HARQ-ACK is the acknowledgment, the proportion of the target HARQ-ACK is less than or equal to an eighth preset value in the L time units, where L is a positive integer less than or equal to M.

For example, in a case that L is less than M, the L time units are the last L time units in the M time units that are sorted in an order from first to last of times.

In some embodiments, in the L time units, each time unit includes at least one target HARQ-ACK.

In some embodiments, the fifth preset value, the sixth preset value, the seventh preset value, and the eighth preset value are specified in a protocol or configured by a network.

In some embodiments, the quantity of target HARQ-ACKs includes any one of the following:
- a quantity of target HARQ-ACKs in one HARQ-ACK codebook, where the HARQ-ACK codebook is any HARQ-ACK codebook corresponding to the HARQ-ACK information;
- quantities of target HARQ-ACKs in all HARQ-ACK codebooks corresponding to the HARQ-ACK information;
- a quantity of target HARQ-ACKs of a first serving cell, where the first serving cell is any serving cell of all serving cells corresponding to the HARQ-ACK codebook; or
- a sum of quantities of target HARQ-ACKs of all the serving cells corresponding to the HARQ-ACK codebook.

In some embodiments, the proportion of the target HARQ-ACK includes any one of the following:
- a ratio of a quantity of target HARQ-ACKs in one HARQ-ACK codebook to a quantity of HARQ-ACKs included in the HARQ-ACK codebook, where the HARQ-ACK codebook is any HARQ-ACK codebook corresponding to the HARQ-ACK information;
- a ratio of quantities of target HARQ-ACKs in all HARQ-ACK codebooks corresponding to the HARQ-ACK information to quantities of HARQ-ACKs included in all the HARQ ACK codebooks;
- a ratio of a quantity of target HARQ-ACKs of a second serving cell to a quantity of HARQ-ACKs of the second serving cell, where the second serving cell is any serving cell of all serving cells corresponding to the HARQ-ACK codebook; or
- a ratio of a sum of quantities of target HARQ-ACKs of all the serving cells corresponding to the HARQ-ACK codebook to a sum of quantities of HARQ-ACKs of all the serving cells.

The terminal provided in this embodiment of the present disclosure can implement the processes implemented by the terminal in the method embodiment of FIG. 2. To avoid repetition, details are not described herein again.

Figure 9:
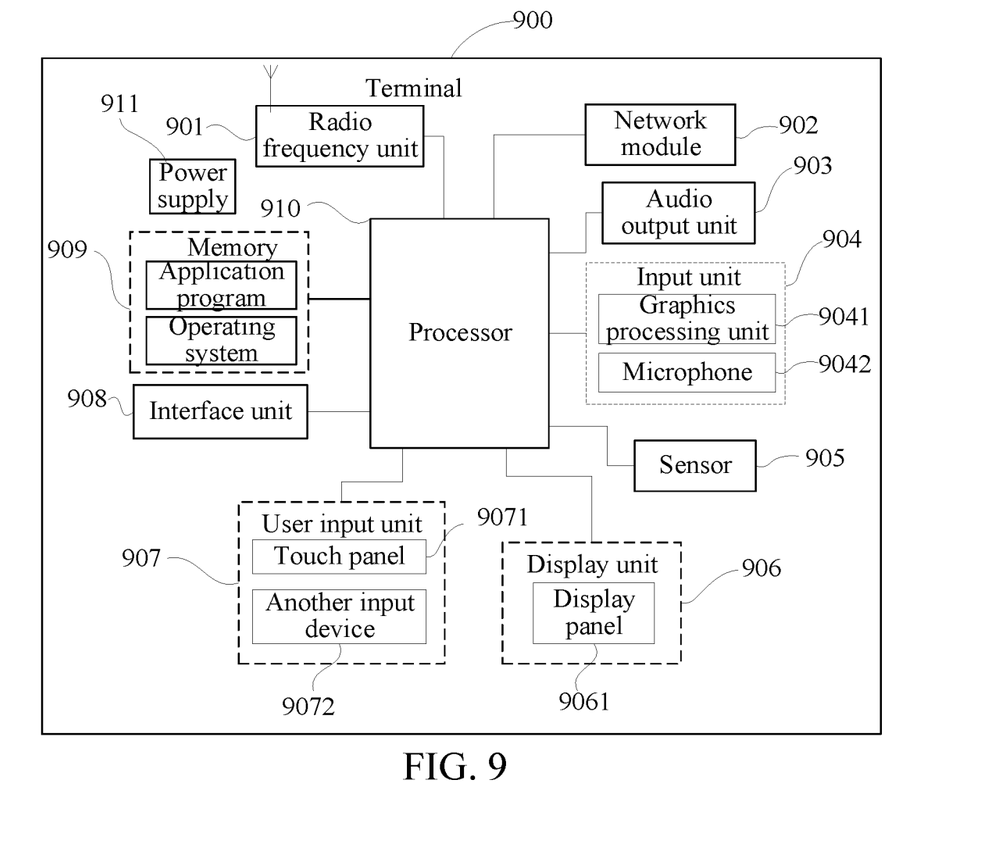
FIG. 9 is a structural diagram of another terminal according to an embodiment of the present disclosure.

FIG. 9 is a schematic structural diagram of hardware of a terminal for implementing various embodiments of the present disclosure.

The terminal 900 includes, but is not limited to, components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the terminal structure shown in FIG. 9 does not constitute a limitation on the terminal, and the terminal may include more or fewer components than shown, or combine some components, or have different component arrangements. In the embodiments of the present disclosure, the terminal includes, but is not limited to, a mobile phone, a tablet computer, a notebook computer, a handheld computer, an in-vehicle terminal, a wearable device, a pedometer, and the like.

The radio frequency unit 901 is configured to receive a PDSCH sent by a network device; and report CSI in a case that HARQ-ACK information corresponding to N PDSCHs includes at least one target HARQ-ACK, where N is a positive integer, and the target HARQ-ACK is acknowledgment or negative acknowledgment.

It should be understood that in this embodiment, the processor 910 and the radio frequency unit 901 can implement the processes implemented by the terminal in the method embodiment of FIG. 2. To avoid repetition, details are not described herein again.

It should be understood that in this embodiment of the present disclosure, the radio frequency unit 901 may be configured to send and receive a signal in an information receiving and sending process or a call process. After downlink data from a base station is received, the downlink data is sent to the processor 910 for processing. In addition, uplink data is sent to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with the network and another device through a wireless communication system.

The terminal may provide, by using the network module 902, wireless broadband Internet access for a user, for example, help the user to receive or send an email, browse a webpage, and access stream media.

The audio output unit 903 may convert audio data received by the radio frequency unit 901 or the network module 902 or stored in the memory 909 into an audio signal and output the audio signal as sound. In addition, the audio output unit 903 may further provide an audio output that is related to a particular function executed by the terminal 900 (for example, a call signal receiving sound or a message receiving sound). The audio output unit 903 includes a loudspeaker, a buzzer, a receiver, and the like.

The input unit 904 is configured to receive an audio or video signal. The input unit 904 may include a Graphics Processing Unit (GPU) 9041 and a microphone 9042. The graphics processing unit 9041 performs processing on image data of a static picture or a video that is obtained by an image acquisition device (for example, a camera) in a video acquisition mode or an image acquisition mode. The processed image frame can be displayed on the display unit 906. An image frame that has been processed by the graphics processing unit 9041 may be stored in the memory 909 (or another storage medium) or sent by using the radio frequency unit 901 or the network module 902. The microphone 9042 may receive a sound, and can process the sound into audio data. The processed audio data may be transferred, in a phone talk mode, to a format that may be sent to a mobile communication base station via the radio frequency unit 901 to output.

The terminal 900 further includes at least one sensor 905 such as an optical sensor, a motion sensor, or another sensor. In some embodiments, the optical sensor includes an ambient light sensor and a proximity sensor. The ambient light sensor may adjust luminance of the display panel 9061 according to brightness of the ambient light. The proximity sensor may switch off the display panel 9061 and/or backlight when the terminal 900 is moved to the ear. As one type of motion sensor, an accelerometer sensor can detect magnitudes of accelerations in various directions (generally, on three axes), may detect a magnitude and a direction of the gravity when static, and may be applied to recognizing the attitude of the terminal (for example, switching between landscape orientation and portrait orientation, a related game, and magnetometer attitude calibration), a function related to vibration recognition (such as a pedometer and a knock), and the like. The sensor 905 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 906 is configured to display information input by the user or information provided for the user. The display unit 906 may include a display panel 9061. The display panel 9061 may be configured by using a Liquid Crystal Display (LCD), an Organic Light-Emitting Diode (OLED), or the like.

The user input unit 907 may be configured to receive input digit or character information, and generate a keyboard signal input related to the user setting and function control of the terminal. In some embodiments, the user input unit 907 includes a touch panel 9071 and another input device 9072. The touch panel 9071, also referred to as a touchscreen, may collect a touch operation of a user on or near the touch panel (such as an operation of a user on or near the touch panel 9071 by using any suitable object or attachment, such as a finger or a touch pen). The touch panel 9071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 910. Moreover, the touch controller may receive and execute a command transmitted from the processor 910. In addition, the touch panel 9071 may be implemented by using various types, such as a resistive type, a capacitive type, an infrared type, and a surface acoustic wave type. In addition to the touch panel 9071, the user input unit 907 may further include the another input device 9072. In some embodiments, the another input device 9072 may include, but is not limited to, a physical keyboard, a functional key (such as a volume control key or a switch key), a track ball, a mouse, and a joystick, which are not described herein in detail.

Further, the touch panel 9071 may cover the display panel 9061. After detecting a touch operation on or near the touch panel, the touch panel 9071 transfers the touch operation to the processor 910, to determine a type of a touch event. Then, the processor 910 provides a corresponding visual output on the display panel 9061 according to the type of the touch event. In FIG. 9, the touch panel 9071 and the display panel 9061 implement, as two independent parts, input and output functions of the terminal. However, in some embodiments, the touch panel 9071 and the display panel 9061 may be integrated to implement the input and output functions of the terminal. The details are not limited herein.

The interface unit 908 is an interface for connecting an external apparatus and the terminal 900. For example, the external apparatus may include a wired or wireless headset port, an external power supply (or battery charger) port, a wired or wireless data port, a memory card port, a port for connecting an apparatus with a recognition module, an audio Input/Output (I/O) port, a video I/O port, a headphone port, and the like. The interface unit 908 may be configured to receive input (for example, data information or power) from an external apparatus and transmit the received input to one or more elements in the terminal 900 or may be configured to transmit data between the terminal 900 and the external apparatus.

The memory 909 may be configured to store a software program and various data. The memory 909 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 909 may include a high speed random access memory, and may further include a non-volatile memory, such as at least one magnetic disk storage device, a flash memory device or other non-volatile solid state storage devices.

The processor 910 is a control center of the terminal, and connects to various parts of the terminal by using various interfaces and lines. By running or executing the software program and/or module stored in the memory 909, and invoking data stored in the memory 909, the processor performs various functions and data processing of the terminal, thereby performing overall monitoring on the terminal. The processor 910 may include one or more processing units.

In some embodiments, the processor 910 may integrate an application processor and a modem processor. The application processor mainly processes an operating system, a user interface, an application program, and the like. The modem processor mainly processes wireless communication. It may be understood that the foregoing modem processor may either not be integrated into the processor 910.

The terminal 900 may further include a power supply 911 (such as a battery) for supplying power to the components. The power supply 911 may be logically connected to the processor 910 by a power management system, thereby implementing functions such as charging, discharging, and power consumption management by using the power management system.

In addition, the terminal 900 includes some functional module that are not shown, which are not described herein in detail.

An embodiment of the present disclosure further provides a terminal, including a processor 910, a memory 909, and a computer program stored on the memory 909 and executable on the processor 910, where the computer program, when executed by the processor 910, implements the processes of the embodiment of the method for reporting CSI, and can achieve the same technical effects. To avoid repetition, details are not described herein again.

An embodiment of the present disclosure further provides a computer-readable storage medium, storing a computer program, where the computer program, when executed by a processor, implements the processes of the embodiment of the method for reporting CSI provided in the embodiments of the present disclosure, and can achieve the same technical effects. To avoid repetition, details are not described herein again. The computer-readable storage medium may include a flash drive, a Read-Only Memory (ROM), a Random Access Memory (RAM), a magnetic disk, or an optical disc.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that for convenience and conciseness of description, for specific working processes of the foregoing described system, apparatus, and unit, refer to the corresponding processes in the foregoing method embodiments, and details are not described herein.

In the embodiments provided in this application, it should be understood that the disclosed apparatus and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a base station, or the like) to perform the methods described in the embodiments of the present disclosure.

A person of ordinary skill in the art may understand that all or some of the procedures of the methods of the foregoing embodiments may be implemented by a computer program controlling relevant hardware. The program may be stored in a computer-readable storage medium. When the program is executed, the procedures of the foregoing method embodiments may be implemented. The foregoing storage medium may be a magnetic disc, an optical disc, a ROM, a RAM, or the like.

It may be understood that, the embodiments described in the embodiments of the present disclosure may be implemented by using software, hardware, firmware, middleware, microcode, or a combination thereof. For hardware implementation, modules, units, and subunits may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general-purpose processor, a controller, a micro-controller, a microprocessor, and other electronic units configured to execute the functions in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented inside or outside the processor.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

The invention claimed is:
1. A method for reporting Channel State Information (CSI), performed by a terminal, the method comprising:
  receiving a Physical Downlink Shared CHannel (PDSCH) sent by a network device; and
  reporting CSI in response to that Hybrid Automatic Repeat reQuest-ACKnowledgment (HARQ-ACK) information corresponding to N PDSCHs comprises at least one target HARQ-ACK,
  wherein N is a positive integer, and the target HARQ-ACK is acknowledgment or negative acknowledgment,
  wherein the at least one target HARQ-ACK meets the following:

when the target HARQ-ACK is the negative acknowledgment, a quantity of target HARQ-ACKs is greater than or equal to a first preset value;

when the target HARQ-ACK is the acknowledgment, the quantity of the target HARQ-ACKs is less than or equal to a second preset value;

when the target HARQ-ACK is the negative acknowledgment, a proportion of the target HARQ-ACK is greater than or equal to a third preset value; or when the target HARQ-ACK is the acknowledgment, the proportion of the target HARQ-ACK is less than or equal to a fourth preset value, wherein the first preset value, the second preset value, the third preset value, and the fourth preset value are specified in a protocol or configured by a network.

2. The method according to claim 1, wherein when the at least one HARQ-ACK codebook comprises P HARQ-ACK codebooks, a priority of a first HARQ-ACK codebook is higher than a priority of a second HARQ-ACK codebook in the P HARQ-ACK codebooks, and the second HARQ-ACK codebook is a HARQ-ACK codebook other than the first HARQ-ACK codebook in the P HARQ-ACK codebooks, wherein P is an integer greater than 1.

3. The method according to claim 1, wherein the at least one SPS PDSCH comprises a first SPS PDSCH, and a priority of the first SPS PDSCH is higher than a priority of a second SPS PDSCH.

4. The method according to claim 1, wherein the HARQ-ACK information is transmitted in M time units, wherein M is a positive integer.

5. The method according to claim 4, wherein when M is greater than 1, the at least one target HARQ-ACK meets the following:

when the target HARQ-ACK is the negative acknowledgment, a quantity of the target HARQ-ACKs is greater than or equal to a fifth preset value in L time units;

when the target HARQ-ACK is the acknowledgment, the quantity of the target HARQ-ACKs is less than or equal to a sixth preset value in the L time units;

when the target HARQ-ACK is the negative acknowledgment, a proportion of the target HARQ-ACK is greater than or equal to a seventh preset value in the L time units; or when the target HARQ-ACK is the acknowledgment, the proportion of the target HARQ-ACK is less than or equal to an eighth preset value in the L time units, wherein L is a positive integer less than or equal to M.

6. The method according to claim 5, wherein when L is less than M, the L time units are the last L time units in the M time units that are sorted in an order from first to last of times.

7. The method according to claim 5, wherein in the L time units, each time unit comprises at least one target HARQ-ACK.

8. The method according to claim 5, wherein the fifth preset value, the sixth preset value, the seventh preset value, and the eighth preset value are specified in the protocol or configured by the network.

9. The method according to claim 1, wherein the quantity of the target HARQ-ACKs comprises any one of the following:

a quantity of the target HARQ-ACKs in one HARQ-ACK codebook, wherein the HARQ-ACK codebook is any HARQ-ACK codebook corresponding to the HARQ-ACK information;

quantities of the target HARQ-ACKs in all HARQ-ACK codebooks corresponding to the HARQ-ACK information;

a quantity of the target HARQ-ACKs of a first serving cell, wherein the first serving cell is any serving cell of all serving cells corresponding to the HARQ-ACK codebook; or a sum of quantities of the target HARQ-ACKs of all the serving cells corresponding to the HARQ-ACK codebook.

10. The method according to claim 1, wherein the proportion of the target HARQ-ACK comprises any one of the following:

a ratio of a quantity of the target HARQ-ACKs in one HARQ-ACK codebook to a quantity of HARQ-ACKs comprised in the HARQ-ACK codebook, wherein the HARQ-ACK codebook is any HARQ-ACK codebook corresponding to the HARQ-ACK information;

a ratio of quantities of the target HARQ-ACKs in all HARQ-ACK codebooks corresponding to the HARQ-ACK information to quantities of the HARQ-ACKs comprised in all the HARQ ACK codebooks;

a ratio of a quantity of the target HARQ-ACKs of a second serving cell to a quantity of HARQ-ACKs of the second serving cell, wherein the second serving cell is any serving cell of all serving cells corresponding to the HARQ-ACK codebook; or a ratio of a sum of quantities of the target HARQ-ACKs of all the serving cells corresponding to the HARQ-ACK codebook to a sum of quantities of the HARQ-ACKs of all the serving cells.

11. A terminal, comprising:

a memory storing computer-readable instructions; and a processor coupled to the memory and configured to execute the computer-readable instructions, wherein the computer-readable instructions, when executed by the processor, cause the processor to perform operations comprising:

receiving a Physical Downlink Shared CHannel (PDSCH) sent by a network device; and reporting CSI in response to that Hybrid Automatic Repeat reQuest-ACKnowledgment (HARQ-ACK) information corresponding to N PDSCHs comprises at least one target HARQ-ACK, wherein N is a positive integer, and the target HARQ-ACK is acknowledgment or negative acknowledgment, wherein the at least one target HARQ-ACK meets the following:

when the target HARQ-ACK is the negative acknowledgment, a quantity of target HARQ-ACKs is greater than or equal to a first preset value;

when the target HARQ-ACK is the acknowledgment, the quantity of the target HARQ-ACKs is less than or equal to a second preset value;

when the target HARQ-ACK is the negative acknowledgment, a proportion of the target HARQ-ACK is greater than or equal to a third preset value; or when the target HARQ-ACK is the acknowledgment, the proportion of the target HARQ-ACK is less than or equal to a fourth preset value, wherein the first preset value, the second preset value, the third preset value, and the fourth preset value are specified in a protocol or configured by a network.

12. The terminal according to claim 11, wherein when the at least one HARQ-ACK codebook comprises P HARQ-ACK codebooks, a priority of a first HARQ-ACK codebook is higher than a priority of a second HARQ-ACK codebook in the P HARQ-ACK codebooks, and the second HARQ-ACK codebook is a HARQ-ACK codebook other than the first HARQ-ACK codebook in the P HARQ-ACK codebooks, wherein P is an integer greater than 1.

13. The terminal according to claim 11, wherein the at least one SPS PDSCH comprises a first SPS PDSCH, and a priority of the first SPS PDSCH is higher than a priority of a second SPS PDSCH.

14. The terminal according to claim 11, wherein the HARQ-ACK information is transmitted in M time units, wherein M is a positive integer.

15. The terminal according to claim 14, wherein when M is greater than 1, the at least one target HARQ-ACK meets the following:
  when the target HARQ-ACK is the negative acknowledgment, a quantity of the target HARQ-ACKs is greater than or equal to a fifth preset value in L time units;
  when the target HARQ-ACK is the acknowledgment, the quantity of the target HARQ-ACKs is less than or equal to a sixth preset value in the L time units;
  when the target HARQ-ACK is the negative acknowledgment, a proportion of the target HARQ-ACK is greater than or equal to a seventh preset value in the L time units; or
  when the target HARQ-ACK is the acknowledgment, the proportion of the target HARQ-ACK is less than or equal to an eighth preset value in the L time units,
  wherein L is a positive integer less than or equal to M.

16. A non-transitory computer-readable medium storing instructions that, when executed by a processor, cause the processor to perform a method for reporting Channel State Information (CSI), wherein the method comprises:
  receiving a Physical Downlink Shared CHannel (PDSCH) sent by a network device; and
  reporting CSI in response to that Hybrid Automatic Repeat reQuest-ACKnowledgment (HARQ-ACK) information corresponding to N PDSCHs comprises at least one target HARQ-ACK,
  wherein N is a positive integer, and the target HARQ-ACK is acknowledgment or negative acknowledgment,
  wherein the at least one target HARQ-ACK meets the following:
    when the target HARQ-ACK is the negative acknowledgment, a quantity of target HARQ-ACKs is greater than or equal to a first preset value;
    when the target HARQ-ACK is the acknowledgment, the quantity of the target HARQ-ACKs is less than or equal to a second preset value;
    when the target HARQ-ACK is the negative acknowledgment, a proportion of the target HARQ-ACK is greater than or equal to a third preset value; or
    when the target HARQ-ACK is the acknowledgment, the proportion of the target HARQ-ACK is less than or equal to a fourth preset value,
    wherein the first preset value, the second preset value, the third preset value, and the fourth preset value are specified in a protocol or configured by a network.

17. The terminal according to claim 15, wherein when L is less than M, the L time units are the last L time units in the M time units that are sorted in an order from first to last of times.

18. The terminal according to claim 15, wherein in the L time units, each time unit comprises at least one target HARQ-ACK.

19. The terminal according to claim 15, wherein the fifth preset value, the sixth preset value, the seventh preset value, and the eighth preset value are specified in a protocol or configured by a network.

20. The terminal according to claim 11, wherein the quantity of the target HARQ-ACKs comprises any one of the following:
  a quantity of the target HARQ-ACKs in one HARQ-ACK codebook, wherein the HARQ-ACK codebook is any HARQ-ACK codebook corresponding to the HARQ-ACK information;
  quantities of the target HARQ-ACKs in all HARQ-ACK codebooks corresponding to the HARQ-ACK information;
  a quantity of the target HARQ-ACKs of a first serving cell, wherein the first serving cell is any serving cell of all serving cells corresponding to the HARQ-ACK codebook; or
  a sum of quantities of the target HARQ-ACKs of all the serving cells corresponding to the HARQ-ACK codebook.

* * * * *